Patented Jan. 8, 1946

2,392,686

UNITED STATES PATENT OFFICE 2,392,686

RESINOUS COMPOSITIONS

Frederick M. Murdock, Chicopee Falls, Mass., assignor to Monsanto Chemical Company, St. Louis, Mo., a corporation of Delaware No Drawing. Application April 16, 1941,
Serial No. 388,793

3 Claims. (Cl. 260—43)

This invention relates to new and improved compositions comprising mixtures embodying phenolic resins and water-soluble vinyl resins, and the products obtained by treating said mixtures under reacting conditions.

It is well known that there are many types of high molecular weight materials in commercial use for various purposes. Certain of these materials are described as synthetic resins, such as, for example, phenol aldehyde resins, urea aldehyde resins, polyvinyl resins, etc. These synthetic resins vary widely in such properties as solubility, color, adhesiveness, toughness, etc., and various modifications of such materials have been employed in order to produce materials with advantageous combinations of physical properties.

It is an object of this invention to prepare improved compositions comprising mixtures embodying water-soluble vinyl resins and phenol-aldehyde resins prepared by reacting a phenol with more than an equimolecular proportion of an aldehyde. A further object is to prepare such mixtures without the use of special reactants or drastic reaction conditions. Another object is to provide aqueous solutions of heat-hardenable compositions comprising mixtures of said phenol-aldehyde resins and polyvinyl alcohols.

According to the present invention, highly advantageous compositions are obtainable by incorporating a water-soluble vinyl resin with a phenolic resin prepared by reacting a phenol with more than an equimolecular proportion of an aldehyde. The present invention thus comprehends the use of phenolic resins that are at least substantially free from unreacted phenol.

The preferred water-soluble vinyl resins employed according to this invention comprise polyvinyl alcohol per se and the so-called partial derivatives of polyvinyl alcohol wherein some of the hydroxyl radicals in the molecule are replaced by other radicals, as for example, ester, ether, or acetal radicals. When the hydroxyl radicals substantially predominate, these partial derivatives of polyvinyl alcohol show essentially the properties of polyvinyl alcohol per se, as for example, solubility in water, and are thereby distinguished from the esters, acetals, etc., which are soluble only in organic solvents. Such water-soluble derivatives of polyvinyl alcohol are included within the scope of the term "polyvinyl alcohol" where it is employed herein and in the appended claims. Preferably, the phenol aldehyde resins employed according to this invention are of the water-soluble type which contain more than one mol of combined aldehyde (for example, formaldehyde) for each mol of a phenol (for example, phenol) in the original reaction mixture. Such water-soluble resins are presumed to derive their water solubility from alcoholic groups in the resin molecules resulting from the reaction between the phenol and the excess aldehyde. However, regardless of the chemical nature of these water-soluble resins, in accordance with this invention, such phenolic resins are employable in forming stable compositions with polyvinyl alcohols at moderate temperatures and without the use of special reactants, which products are generally readily water-soluble. Furthermore, these compositions can be heated to form substantially infusible products without separation of either component from the compositions during the hardening of the same.

Prior methods of producing polyvinyl alcohol-phenol-aldehyde resin compositions have comprised the use of phenolic resins prepared by reacting a phenol with less than an equimolecular proportion of formaldehyde. It is well known that such phenolic resins tend to be water insoluble and tend to contain a certain proportion of free phenol. Accordingly, these compositions, even when acidified, tend to be quickly discolored by the action of light. Furthermore, such compositions tend to possess poor thermosetting qualities. Other prior methods of preparing phenol-aldehyde resin-vinyl resin compositions have comprised reaction of two or more of the reactants at elevated temperatures, as for example, refluxing a mixture of phenol and polyvinyl acetate before the aldehyde is introduced or the use of modifying reactants and high temperature reaction. As indicated hereinbefore, the preferred process of this invention does not necessitate the use of the foregoing prior expedients, and the materials obtained by this process possess highly advantageous characteristics. Thus, for example, the products obtained, according to the preferred process of this invention, tend to possess a high degree of light resistance when in an acidified state and a high degree of flexibility and water resistance after being heat-hardened to the infusible state.

The improved properties of the preferred products of this invention, coupled with the fact, hereinafter shown, that at least a substantial amount of the polyvinyl alcohol is not extractable from the hardened product, indicates that some type of chemical combination takes place between the polyvinyl alcohol and the phenolic resin. One theory is that alcoholic groups, which are presumably present in considerable quantity by virtue of the excess of methylene group-containing agents employed in making the phenolic resin, react in some manner with the polyvinyl alcohol. However, regardless of the mechanism of the chemical process, at least a substantial amount of the polyvinyl alcohol is found to be firmly bound up in the final product.

There are various methods that may be employed to prepare the water-soluble phenolic resins to be employed according to the preferred process of this invention. Preferably, in order to maintain substantial water-solubility while reacting at least a major proportion of the aldehyde, the mixture of the phenol and the aldehyde is heated under alkaline conditions. Thus, it has been found that if the reaction mix possesses initially a pH of substantially 9, an advantageous product can be obtained.

The more preferred phenolic resins are prepared by reacting phenol with more than 1 and, under certain conditions, with 2 to 3 or more mols of formaldehyde per mol of phenol but preferably with from about 1.25 to about 3.0 mols of formaldehyde per mol of phenol in the presence of sodium hydroxide, or other strong alkali, in a sufficient amount to produce a mixture with a pH of substantially 9. This mixture is advantageously heated at a temperature of 60-70° C. until at least a major proportion of the formaldehyde has reacted. If the heating period is continued too long, the resulting resin will tend to lose its substantial solubility in water. On the other hand, if too little formaldehyde is reacted, an excessive amount of formaldehyde may be lost during any subsequent dehydration of the resin. Thus, when a molar ratio of formaldehyde to phenol of 3 to 1 is employed, the reaction is preferably continued until substantially 70-80% of the available formaldehyde has reacted. When a 2 to 1 molar ratio of formaldehyde to phenol is employed, the reaction is preferably continued until substantially 90-95% of the formaldehyde has reacted. Still higher percentages of available formaldehyde are advantageously reacted when lower formaldehyde-phenol ratios are employed.

When it is desired to produce light colored and light stable products, the reaction product is acidified by the addition of a suitable acid, as for example, by the addition of such an organic acid as lactic acid. Extremely light colored and light resistant products are obtained if the pH of the resin is reduced appreciably below 7 and, preferably to a value between 4 and 5.5.

Furthermore, the phenolic resin may be either partially or substantially dehydrated in a suitable manner and, preferably, by vacuum distillation at about 50-80° C. The acidification may take place either prior to or during the dehydration of the resin. If, however, the resin is to be substantially dehydrated prior to acidification, the mixture is generally reacted for a somewhat shorter period prior to its dehydration and the dehydration prior to acidification is carried out below substantially 65° C., thereby avoiding excessive reaction.

According to the present invention, polyvinyl alcohol is readily incorporated with the water-soluble phenolic resins prepared by the foregoing procedure and the resulting compositions may be applied in any suitable manner and subsequently hardened by heat with or without the application of pressure. The water-soluble phenolic resins employed according to this invention are generally of such a nature that polyvinyl alcohol can be incorporated in them at any stage of their preparation while they are still capable of being liquefied. A most advantageous point at which to add the polyvinyl alcohol is immediately after the initial alkaline reaction. However, this is not critical and the polyvinyl alcohol may be added after dehydration and/or acidification of the phenolic resin.

A particular advantage of the preferred products of this invention resides in their water solubility. By employing water solutions of these compositions, admirable materials for coating, cementing, impregnating and the like purposes are provided which avoid the use of inflammable and expensive solvents. Of course, as the mixtures approach the point of gelation their solubility in water tends to decrease. However, even when thickened to viscosities of 2000-5000 centipoises at substantially 80° C. by vacuum distillation, the preferred compositions of the present invention can be thinned out with 5-10%, or even more water without precipitation.

The amount of polyvinyl alcohol incorporated in the phenolic resin varies with the particular phenolic resin being employed and the purpose for which the composition is being prepared. The addition of about 10% by weight of a polyvinyl alcohol to the phenolic resin is advantageous for many purposes, but the addition of only 2% produces a noticeable modification of certain properties of the phenolic resin and the addition of 30 or 40% of polyvinyl alcohol is advantageous for many purposes for which thermosetting resins are suitable. Much higher proportions of polyvinyl alcohol may be employed in preparing compositions that tend to lose their thermosetting properties. Such compositions are primarily employable for coating, impregnating and cementing purposes.

In preparing mixtures of substantially dehydrated water-soluble phenolic resins and polyvinyl alcohol, it has been found advantageous to first dissolve the polyvinyl alcohol in water and then add this solution to the phenolic resin. If desired, part or all of the water present may then be removed by a suitable method, for example, by vacuum distillation. Other methods of preparing the compositions of this invention comprise dissolving the polyvinyl alcohol directly in the undehydrated reaction product as indicated hereinbefore, or in the initial charge at the time the reaction between the phenol and the aldehyde is started, or in partially dehydrated phenolic resin.

The following is an example of a preferred phenolic resin that may be employed in combination with polyvinyl alcohol according to the present invention. In this and the following examples, the parts are by weight. The polyvinyl alcohol employed in these examples was prepared by hydrolyzing by one of the well-known means, polyvinyl acetate of such a degree of polymerization that a 1 molar benzene solution possessed a viscosity of substantially 25 centipoises at 20° C. It contained substantially 1% to 5% acetate by weight.

*Example 1*

| | Parts |
|---|---|
| Phenol | 400 |
| Formaldehyde (37% solution) | 1032 |
| Soda ash | 20 |

The several ingredients were mixed in a suitable manner. Thus, the phenol in a melted condition was added to the reaction vessel first, followed by the formaldehyde and soda ash. The reaction was carried out in a suitable reaction vessel, equipped with an agitator and capable of withstanding a high vacuum. The air was removed from the apparatus by evacuation and thereafter excluded by closing all openings to the vessel. The reaction mixture was heated to substantially 65° C. and maintained at substantially that temperature for substantially 2½ hours. Thereafter the mixture was subjected to distillation under reduced pressure, the temperature of the mix falling initially to substantially 50° C. and as the water and other volatile materials present boiled off, rising until it reached substantially 65° C. During the last stages of the foregoing distillation, the pressure in the reaction vessel was reduced to a pressure corresponding to substantially 2 inches of mercury. To the substantially dehydrated resin were then added 85 parts of a water solution of lactic acid containing 50% lactic acid by weight and the pH of the resin was thereby lowered to a value of substantially 5.5.

The resulting phenolic resin was found to be very desirable for mixing with polyvinyl alcohol to prepare the compositions of this invention. This phenolic resin was found to contain substantially 10% water and solutions of polyvinyl alcohol in this resin were readily prepared. In one embodiment of this invention, a water solution containing substantially 15 parts by weight of polyvinyl alcohol was mixed with 50 parts of phenolic resin, prepared as described hereinbefore. The resulting solution was suitable for coating, impregnating and the like. Dehydration of water solutions of the compositions of this invention, when they are to be employed, for example, as casting resins, is preferably carried out by vacuum distillation at substantially 80° C. until the desired dehydration and/or viscosity is attained. The resin is then poured into suitable molds and heated at 80–90° C. for several days until the proper hardness is attained. A substantially colorless product is thus obtained with good working qualities.

Another method by which a phenolic resin similar to that of Example 1 may be prepared is to react the phenol and formaldehyde in the presence of the same amount of soda ash for substantially 3 hours at substantially 70° C. followed immediately by acidification as in Example 1. Reaction under these conditions is sufficient to cause substantially 73% of the formaldehyde to react. This product may be further employed and further processed by any of the methods hereinbefore set forth.

A composition prepared from phenol, formaldehyde and polyvinyl alcohol which is substantially like that described above, can be obtained by preparing the phenolic resin in the presence of the polyvinyl alcohol. The following is an example of such a procedure wherein the product was dehydrated, cast and hardened in the usual manner for casting resins.

Example 2

| | Parts |
|---|---|
| Phenol | 400 |
| Formaldehyde (37% solution) | 1032 |
| Polyvinyl alcohol | 80 |
| Soda ash | 20 |

The several components were mixed in a suitable manner. Preferably, the polyvinyl alcohol was dissolved in part or all of the formaldehyde and/or phenol and the remainder of the reactants added thereafter. The reaction conditions employed in Example 1 were also followed in this example.

Following the acidification of the resin by the addition of the lactic acid, the vacuum distillation was continued. Sufficient heat was supplied to the mix to raise the temperature to about 80° C. in about 45 minutes. Thereafter, the distillation was continued at about 80° C. for about 40 minutes. As in Example 1, the reaction mixture was substantially clear throughout the course of the reaction. The liquid and substantially dehydrated product was then poured into suitable molds and hardened by heating the molds and their contents at substantially 85° C. for several days.

The liquid resin was clear, practically colorless and very adhesive at the pouring temperature and when cooled was found to be rubbery. The resin flowed readily but had a tendency to string when a rod was dipped into the liquid and then pulled away. The hardened product was substantially colorless, highly resistant to discoloration by light and possessed good working properties. It was somewhat less clear than a similar phenolic resin containing no polyvinyl alcohol.

Example 3

This example differed from Example 2 in that 80 parts of glycerin were added to the mix immediately following the addition of the lactic acid. Otherwise the proportions of materials and procedure were substantially those employed in Example 2.

The liquid resin poured easily, but possessed the same tendency to string as the product of Example 2. The hardened resin possessed properties similar to those possessed by the product of Example 2.

Example 4

This example illustrates the utility of one embodiment of this invention for coating and like purposes. The phenolic resin in this example was prepared by reacting a mixture of 100 parts of phenol, 110 parts of a 37% solution of formaldehyde and 2 parts of sodium hydroxide in a suitable vessel equipped with a reflux condenser and suitable means of heating and cooling. The reaction mixture was heated to boiling over a period of substantially 15–20 minutes, boiled under reflux conditions for substantially 5 minutes, and thereafter immediately cooled. The resulting aqueous solution of phenolic resin was substantially free from unreacted phenol and formaldehyde.

60 parts of the foregoing product, containing substantially 33 parts solids as determined by weighing a film of this material before and after drying at 135° C. for three hours, were mixed with 15 parts of polyvinyl alcohol, 4.8 parts of glycerin and 75 parts of water. A film of the resulting composition was baked at substantially 140° C. for substantially 25 minutes. The resulting infusible film possessed high flexibility and was much superior in this respect to a film prepared from the phenolic resin in the absence of polyvinyl alcohol. Furthermore, the film prepared from the phenolic resin-polyvinyl alcohol composition was unimpaired after 24 days exposure to water at room temperature.

A film prepared from a mixture comprising 1 part polyvinyl alcohol and substantially 7.7 parts (on a solids basis) of the foregoing phenol-formaldehyde resin was baked at 150° C. for substantially 45 minutes. A similar film was prepared under the same conditions from polyvinyl alcohol without the addition of any phenolic resin. These films were then separately ground to powders, weighed and then extracted with water by means of the well-known Soxhlet extraction apparatus. It was found that the phenolic resin-polyvinyl alcohol composition had lost only substantially 1.65% of its weight as a result of this treatment, while the polyvinyl alcohol had been completely dissolved. Thus, it can be readily seen from consideration of the difference in solubilities of the two products, that a reaction had been effected.

Certain of the numerous variations that may be introduced into this invention without departing from the scope thereof have been pointed out hereinbefore. In addition to these, it is obvious, for example, that the polyvinyl alcohol may be varied in several respects. Generally, polyvinyl alcohol is prepared by suitable hydrolysis of a polyvinyl ester, for example, polyvinyl acetate. The degree of polymerization of the polyvinyl ester employed is not critical and may depend on the particular properties desired in the product. However, the preferred components of the phenolic resin are phenol and formaldehyde, paraformaldehyde being suitably substituted for aqueous formaldehyde solution.

There are numerous uses for which the products of this invention may be advantageously employed, examples of which have already been given. As previously indicated, certain embodiments of this invention are characterized by a high degree of flexibility even after they have been converted into the insoluble infusible stage.

For impregnating purposes, compositions comprising mixtures of polyvinyl alcohol and undehydrated phenolic resins made with aqueous solutions of formaldehyde are frequently advantageously. Such compositions are extremely fluid and do not require the addition of solvents to be suitable for use. The water present can be evaporated off in a suitable manner after the impregnation has been accomplished and the product rendered substantially insoluble and infusible by the application of heat.

This invention is limited solely by the claims attached hereto.

What is claimed is:

1. In a method of preparing a casting composition, the steps which comprise reacting under alkaline conditions phenol and substantially more than an equimolecular proportion of aqueous formaldehyde in the presence of about 20 parts of polyvinyl alcohol for each 100 parts of phenol, and dehydrating the reacted mixture under acid conditions until there is produced a substantially dehydrated liquid which can be cast.

2. A casting resin composition comprising a mixture of a water-soluble polyvinyl alcohol and an alkaline-condensed phenol-formaldehyde resin prepared in accordance with the method of claim 1.

3. A cast resin comprising a heat-hardened mixture of a water-soluble polyvinyl alcohol and an alkaline condensed phenol-formaldehyde resin prepared in accordance with the method of claim 1.

FREDERICK M. MURDOCK.